United States Patent

[11] 3,566,052

[72] Inventor Marvin L. Mindell
Great Neck, N.Y.

[21] Appl. No. 766,393
[22] Filed Oct. 10, 1968
[45] Patented Feb. 23, 1971
[73] Assignee Viewlex, Inc.
Holbrook, N.Y.

[54] PROGRAM CONTROL MEANS
5 Claims, 4 Drawing Figs.

[52] U.S. Cl. .......... 200/46, 200/38
[51] Int. Cl. .......... H01h 43/08
[50] Field of Search .......... 200/38(B & C), 46

[56] References Cited

UNITED STATES PATENTS

| | | | |
|---|---|---|---|
| 1,245,467 | 9/1916 | Kingsbury | 200/46X |
| 2,338,305 | 1/1944 | Simmon | 200/46X |
| 3,176,090 | 3/1965 | Cox | 200/46 |
| 3,178,525 | 4/1965 | Smith | 200/46X |

FOREIGN PATENTS

| | | | |
|---|---|---|---|
| 1,089,451 | 9/1960 | Germany | 200/46 |

*Primary Examiner*—Robert K. Schaefer
*Assistant Examiner*—H. J. Hohauser

ABSTRACT: A program control plate directly actuates power switches. The program control card is a plastic plate or card which has a pair of racks along the bottom side edges and a plurality of ridges on top. The plate or card is inserted in a reader device which has gears which engage the racks. The card is motor driven by control pulses to drive the control card under a bank of microswitches which are actuated by the ridges on the card. The gear arrangement has an initial locating stop which engages the racks in a zero reference position. After the sequence of operations, or at any time, when the card is withdrawn, it actuates a switching arrangement which drives the gears to the zero reference position so that when the card is again inserted, the stop will be in the proper position.

INVENTOR.
MARVIN I. MINDELL

INVENTOR.
MARVIN I. MINDELL

PROGRAM CONTROL MEANS

This invention relates to program control means for directly actuating power devices.

More particularly, the invention relates to a program control plate and reader. The program control plate is, for instance, a plastic plate having a pair of racks on the bottom side and a plurality of ridges arranged in columns on the upper side. The reader incorporates gear means to index and move the control plate and includes a bank of small power switches which are directly actuated by the control plate.

The main purpose of the card is to provide a program control device which is able to actuate power switches directly without the necessity for any photo detection or other detection such as light wire feeling devices such as used on punched cards. All amplification of the control pickup signal is eliminated as well as all power relays.

Conventional program control devices such as punch cards, punch tape and magnetic tape use either photo detection or very lightweight tactile detection. These signals must then be amplified and passed through control circuits or relays to control the ultimate power switches.

In the present device, the card is a rugged mechanism in itself which directly operates the power switches. The card is preferably made of plastic and may be of any desired thickness, and is preferably about one-eighth inch thick with at least one-eighth inch depth on the racks and about one-sixteenth inch height on the control projections.

The present card is easy to handle and ship and is rugged and durable. The card is made by molding by conventional means, except that the mold for the program projections may be made by a programmed milling machine.

The general operation is as follows:

1. The card is inserted in the reading device and seated against the stop pin.
2. A pulse or other activating signal or means actuates the motor to drive the card.
3. There is a card-sensing switch which closes when the card is removed and causes the motor to run until the stop pin on the reader is placed at the proper position for zero reference on the card.

Accordingly, a principal object of the invention is to provide new and improved program control means for controlling apparatus which is adapted to perform a number of sequential functions.

Another object of the invention is to provide new and improved control means which will operate to directly control power switches.

Another object of the invention is to provide new and improved program control means which is adapted to directly control power devices and eliminate all photo or other detector amplifiers or relays.

Another object of the invention is to provide a new and improved control plate for use in a reader for directly controlling the time sequence of multiple operations.

Another object of the invention is to provide new and improved program control means adapted to directly control power devices comprising:

a control plate having a pair of parallel racks connected thereto;

a plurality of ridges mounted on said plate, each ridge being located on a line parallel to said racks, said ridges and lines being spaced predetermined amounts from each other.

These and other objects of the invention will be apparent from the following specification and drawings of which:

Figure 2:
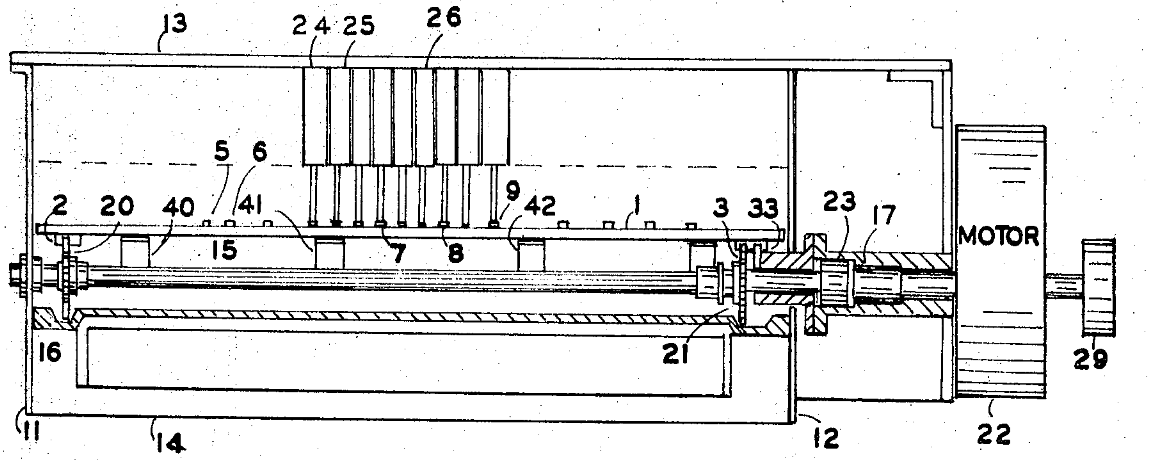
FIG. 2 is an elevation view of FIG. 1, partially in section.
Figure 1:
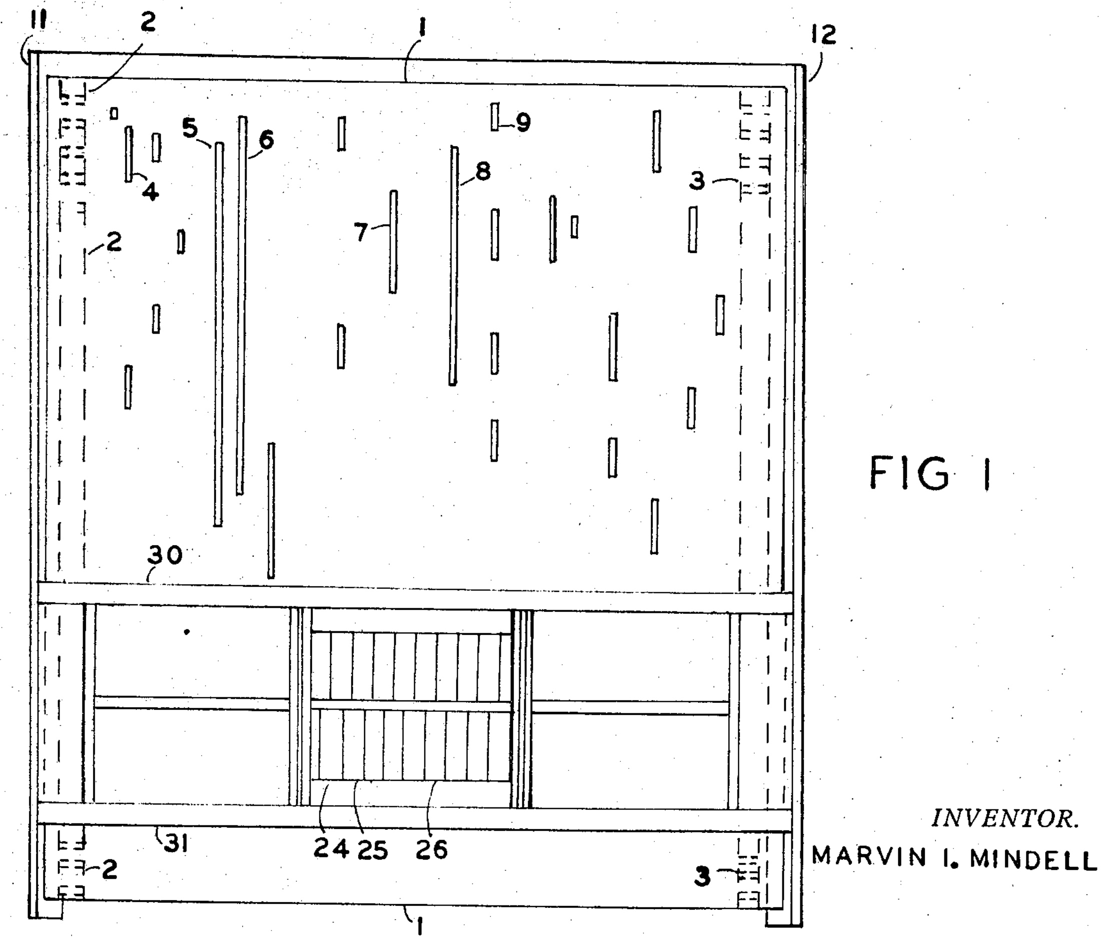
FIG. 1 is a plan view of a control plate in the reader.

Referring to the FIGS., FIGS. 1 and 2 show a control plate 1 which may be of metal or molded plastic. On the bottom side of the plate 1 are a pair of racks 2 and 3, which are adapted to engage gears in the reading device, which will be explained. The top of the plate is organized into an arbitrary number of columns which are parallel with the axes of the racks. The columns may be, for instance, 50 or 60 in number and are analogous to the columns in a punch card. The raised portions, or ridges 4, 5, 6, 7, 8, 9, etc. are incorporated in the top surface of the plate 1 along the imaginary lines or columns referred to above.

The reader comprises a frame having said members 11 and 12 and upper and lower connecting members 13 and 14, which is generally rectangular in shape. Shaft 15 is mounted by means of suitable bearings 16 and 17 connected to the side members. Attached to the shaft are a pair of gears 20, 21, which are adapted to engage the racks 2 and 3 of the card 1. The shaft 15 is adapted to be driven by means of the motor 22 through a one-way clutch 23. On the outer end of the shaft 15 is a control cam 29 which is utilized for synchronizing reference position of the control plate or gears, as will be explained.

Figure 3:
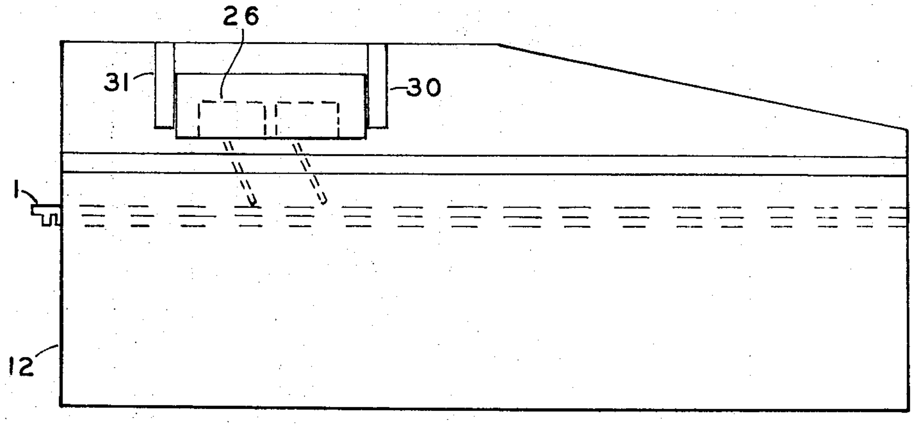
FIG. 3 is a side view of FIG. 1.

A bank of microswitches 24, 25, 26, etc. are mounted to the side and/or top members of the frame by means of support brackets 30 and 31. There are a plurality of leaf springs 40, 41, 42 located under the plate 1 and microswitches to push the plate up into good contact with the switch arms. There is one microswitch located at each control column on the card 1. For instance, if there are 50 control columns, then there would be 50 switches in the control bank. Alternate banks of switches may be used, as illustrated in FIG. 3, to incorporate more columns or larger switches. Each of the control switches is actuated by the corresponding ridge on the control card or plate 1, as the control plate is driven past the particular control switch. The control switches may then be directly connected into power circuits on a multiple operation machine to control power operations.

The switches are big enough to control reasonable means of power directly without any amplification or relays.

A typical embodiment of the control system is incorporated in an audio-visual planetarium device whereby a number of audio and visual presentations are made by means of sound and projector apparatus in order to simulate the various movements of the stars and planets, together with an audio commentary with sound effects and visual indicators for indicating points of interest, etc. However, the present invention is not limited to audio-visual control devices or audio devices. It may be used whenever it is desired to control a number of operations in various time sequences.

Figure 4:
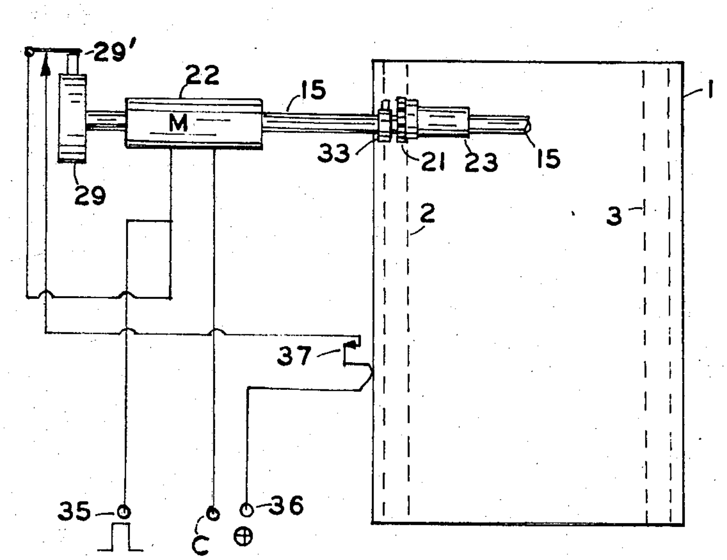
FIG. 4 is a circuit diagram for controlling the synchronization and movement of the control plate.

FIG. 4 shows a circuit diagram for energizing the motor 22 and synchronizing for zero setting the cam 29 system.

Referring to FIG. 4, the plate is synchronized and moved as follows: The motor 22 is connected by means of the shaft 15 and one-way clutch 23 to the driving gear 21. The purpose of the one-way clutch is so that the card can be pulled out.

Adjacent the driving gear 21 and fixedly connected to the shaft 15 is a one tooth-synchronizing gear 33.

When a card is removed, the circuit is energized so that the one tooth gear or stop 33 will be set in a vertical position so as to engage the first tooth on the rack 3 when the card is inserted in the machine and in the direction shown by the arrow.

The motor is indexed by means of pulses applied to the terminal 35 from some suitable source such as a tape or any electrical control, and the circuit is completed back to the common lead C of the power line.

The synchronizing circuit is completed from a positive terminal 36 through switch 37, cam switch 29′ through the motor, back to the common lead C. Switch 37 is held open by a card in the reader. When the card is removed, the switch 37 will be closed, energizing the synchronizing circuit so that the motor will run until the cam 29 opens switch 29′, which occurs when the stop tooth 33 is in the proper position for indexing the plate in zero reference position.

In operation, the card is pushed in the reader up to the point where it is stopped by the stop pin 33.

The program is then started by applying pulses to the terminal 35. The pulses may be from a switch or various other sources. For instance, they may be audio signals taken from a record where the plate is used to control visual presentations tied in with the record. The plate will then advance until the program is over. The plate is then pulled out manually and the synchronizing switch 37 will close to synchronize the stop pin to receive the next plate.

Many modifications may be made by those who desire to practice the invention without departing from the scope thereof which is defined by the invention.

I claim:

1. Program control means adapted to directly control power devices comprising:
a control plate;
means in said plate for indexing said control plate linearly along a predetermined axis;
a plurality of ridges mounted on said plate, each ridge being located on a line parallel to said axis, said ridges and lines being spaced predetermined amounts from each other means for sensing the removal of a plate from said frame, and means responsive to said sensing means to set said motor-driven gears to zero reference position, corresponding to said plate reference position.

2. Apparatus as in claim 1 having:
a frame for mounting said plate for movement in a direction parallel to the axes of said ridges;
a plurality of control devices mounted on said frame, each of said control devices being mounted on a spaced line corresponding to the lines of said ridges so that each ridge will actuate a corresponding control device; and
motor driven gears meshing with racks on said plate to advance said plate.

3. Apparatus as in claim 2, having, means for locating said plate in a reference position.

4. Apparatus as in claim 1 wherein said indexing means comprising a pair of racks mounted on said plate.

5. Apparatus as in claim 2 wherein said control devices are switches.